(12) United States Patent
Martin

(10) Patent No.: US 7,913,647 B1
(45) Date of Patent: Mar. 29, 2011

(54) ANIMAL FOOD DISPENSER AND WATER DISPENSER

(76) Inventor: Ja Kenny Martin, Gonzales, LA (US)

( * ) Notice: Subject to any disclaimer, the term of this patent is extended or adjusted under 35 U.S.C. 154(b) by 0 days.

(21) Appl. No.: 11/497,599

(22) Filed: Aug. 2, 2006

(51) Int. Cl.
*A01K 5/00* (2006.01)

(52) U.S. Cl. ...................................................... 119/52.1

(58) Field of Classification Search ............... 119/51.01, 119/52.1–52.4, 53, 51.02, 51.12; D30/121
See application file for complete search history.

(56) References Cited

U.S. PATENT DOCUMENTS

| | | | |
|---|---|---|---|
| 417,437 A * | 12/1889 | Monfort | 119/65 |
| 3,315,641 A * | 4/1967 | Cochran | 119/53 |
| 5,636,592 A * | 6/1997 | Wechsler | 119/52.1 |
| 5,960,742 A * | 10/1999 | O'Rourke et al. | 119/74 |
| 6,874,445 B2 * | 4/2005 | Polimeni, Jr. | 119/74 |
| 6,988,464 B1 * | 1/2006 | Rutledge | 119/51.01 |
| 7,287,487 B2 * | 10/2007 | Hurwitz | 119/74 |
| 2003/0094139 A1 * | 5/2003 | Greenberg | 119/56.1 |
| 2007/0119378 A1 * | 5/2007 | Fick | 119/52.1 |

* cited by examiner

*Primary Examiner* — Rob Swiatek
*Assistant Examiner* — Kristen C Hayes
(74) *Attorney, Agent, or Firm* — DuFault Law Firm, P.C.; Dustin R. DuFault

(57) ABSTRACT

An animal food dispenser is disclosed. The animal food dispenser includes a base having a base interior and a dispensing slot communicating with the base interior. A food hopper having a hopper interior is provided on the base. A food opening is provided between the hopper interior and the base interior. A food tray pivotally mounted in the hopper adjacent to the food opening is pivotal between closed and opened positions. A water dispenser is also disclosed.

9 Claims, 6 Drawing Sheets

US 7,913,647 B1

ANIMAL FOOD DISPENSER AND WATER DISPENSER

FIELD OF THE INVENTION

The present invention relates to animal feeders. More particularly, the present invention relates to an animal food dispenser and a water dispenser which dispense selected quantities of food and water, respectively, to animals.

BACKGROUND OF THE INVENTION

Animal food dispensers and water dispensers are known in the art for dispensing animal food to pets or other animals. Such animal food dispensers and water dispensers are useful for rationing or conserving food and water, respectively, to prevent wasting of food and water when fed to animals over a prolonged time period. An animal food dispenser and water dispenser are needed which are simple in construction and easy to use.

SUMMARY OF THE INVENTION

The present invention is generally directed to an animal food dispenser. The animal food dispenser includes a base having a base interior and a dispensing slot communicating with the base interior. A food hopper having a hopper interior is provided on the base. A food opening is provided between the hopper interior and the base interior. A food adjustor pivotally mounted in the hopper adjacent to the food opening is pivotal between closed and opened positions. A food gap of variable width is defined between the food adjustor and the food opening when the food adjustor is in the opened position.

The present invention is further directed to a water dispenser. The water dispenser includes a base having a base interior. A water valve cover is provided in the base interior. An inlet nipple is provided on the base, and a fill valve is provided in the water valve cover and communicates with the inlet nipple. A dispensing spout is provided in fluid communication with the fill valve. A drain pipe is provided in fluid communication with the base interior.

BRIEF DESCRIPTION OF THE DRAWINGS

The invention will now be described, by way of example, with reference to the accompanying drawings, in which.

DETAILED DESCRIPTION OF THE INVENTION

Figure 1:
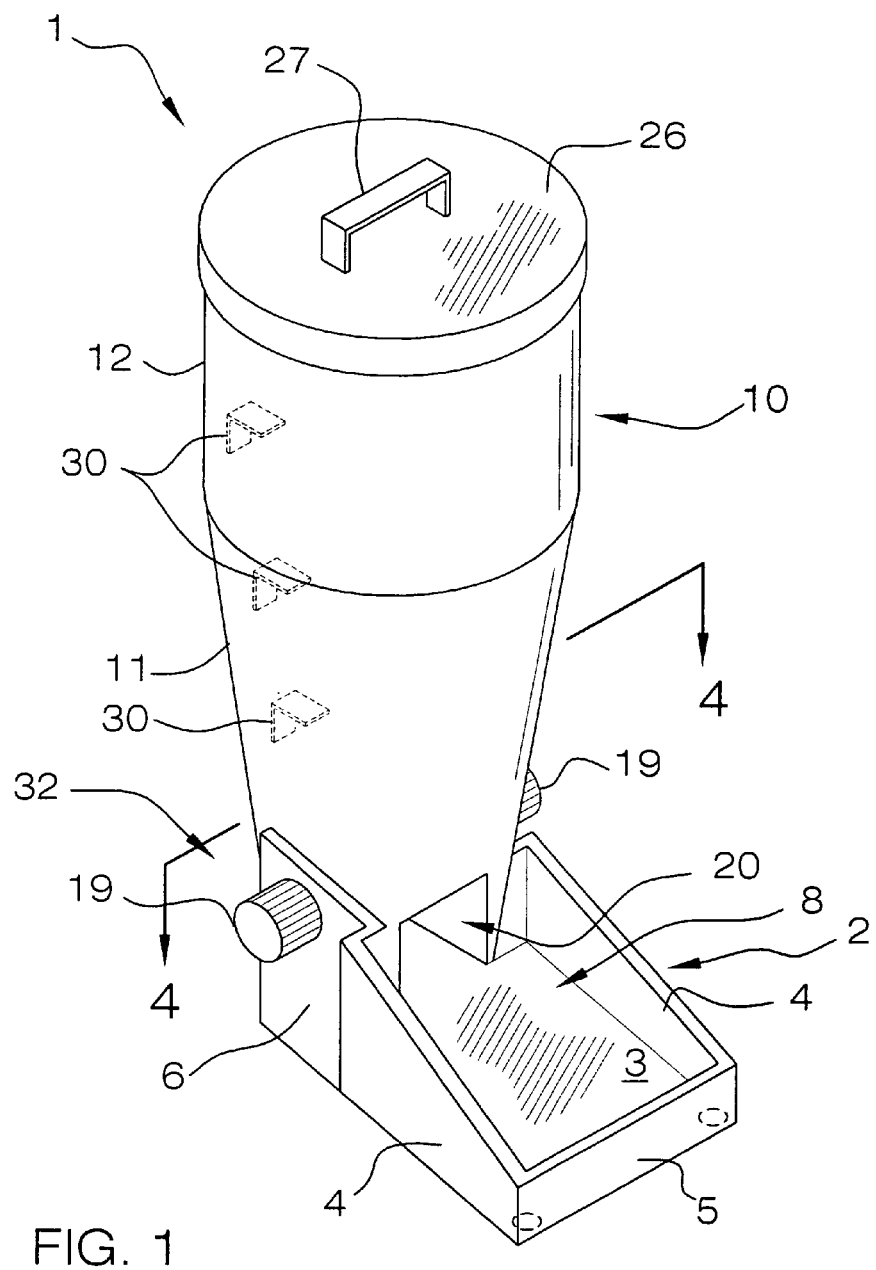
FIG. 1 is a front perspective view of an illustrative embodiment of an animal food dispenser according to the present invention.

Referring initially to FIGS. 1-6, an illustrative embodiment of the animal food dispenser according to the present invention is generally indicated by reference numeral 1. The animal food dispenser 1 typically includes a base 2. As shown in FIG. 1, the base 2 may include a base bottom 3 and base side walls 4 and a base front wall 5 which extend upwardly from the base bottom 3. The base bottom 3, base side walls 4 and base front wall 5 together define a base interior 8. Spaced-apart base flanges 6 may extend from the respective base side walls 4, opposite the base front wall 5.

Figure 4:
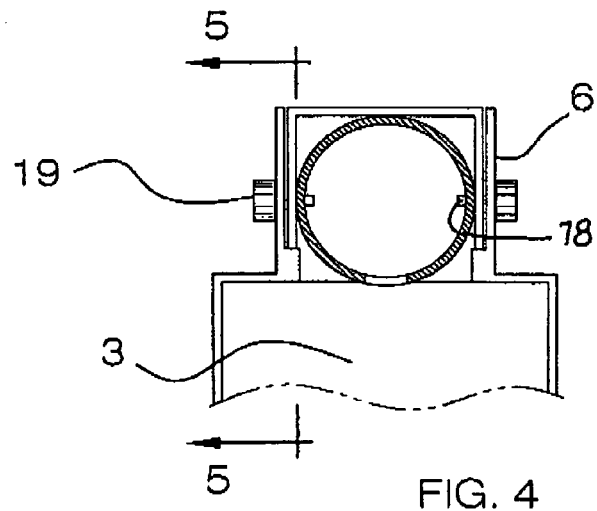
FIG. 4 is a sectional view, taken along section lines 4-4 in FIG. 1, of the animal food dispenser.
Figure 5:
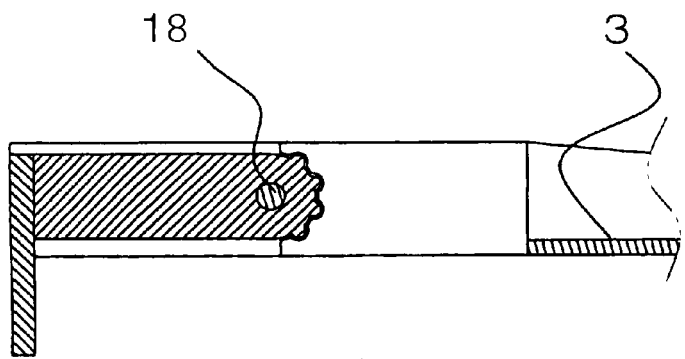
FIG. 5 is a sectional view, taken along section lines 5-5 in FIG. 4, illustrating multiple louvers between a food hopper and a base of the animal food dispenser in a closed configuration.

A food hopper 10 is mounted between the base flanges 6 of the base 2. The food hopper 10 includes a lower hopper portion 11 which is provided on the base 2 and an upper hopper portion 12 which is provided on the lower hopper portion 11. The lower hopper portion 11 and the upper hopper portion 12 together define a hopper interior 13, as shown in FIG. 4. The lower hopper portion 11 includes an hopper opening 20 which communicates with the base 2.

Figure 2:
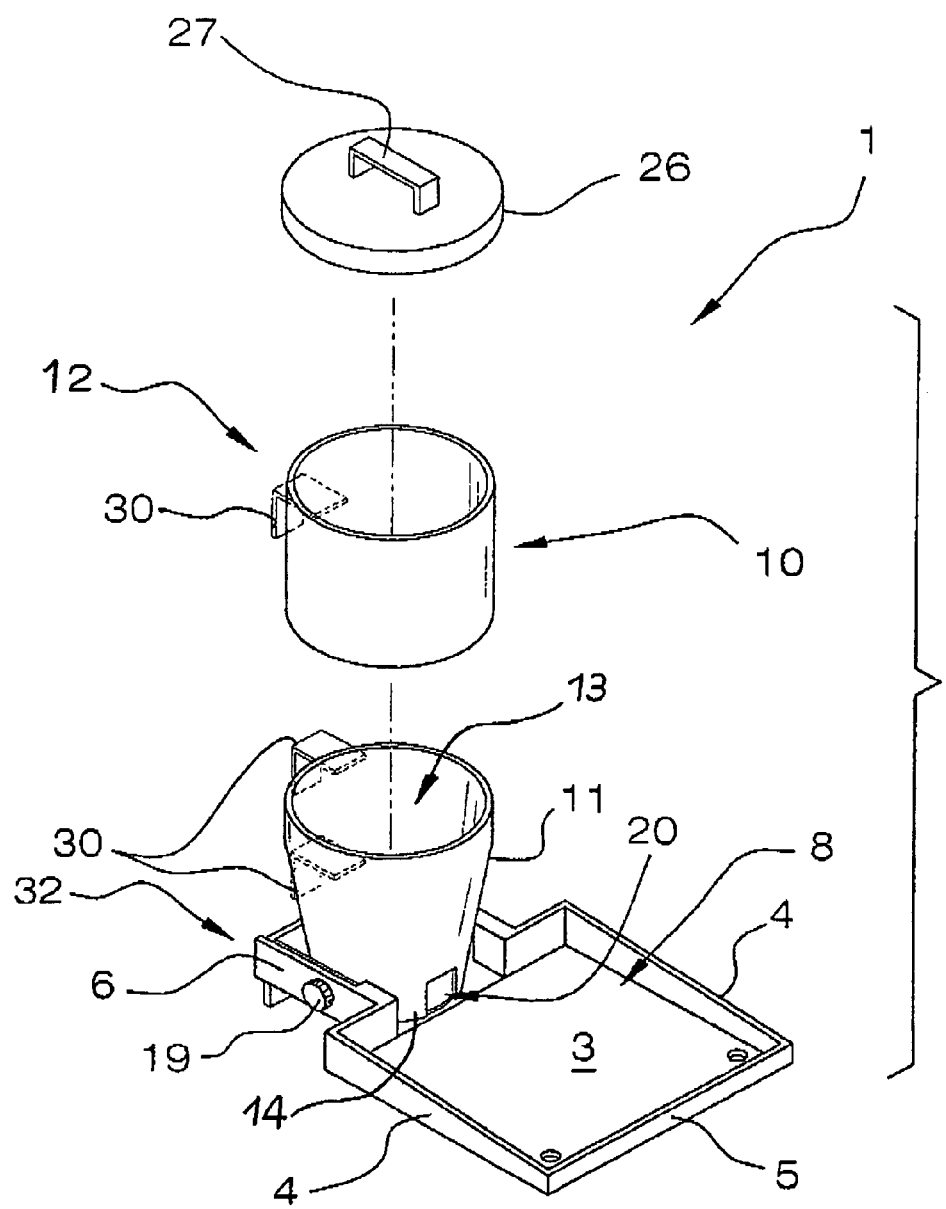
FIG. 2 is a sectional view of an illustrative embodiment of a food dispenser according to the present invention.
Figure 3:
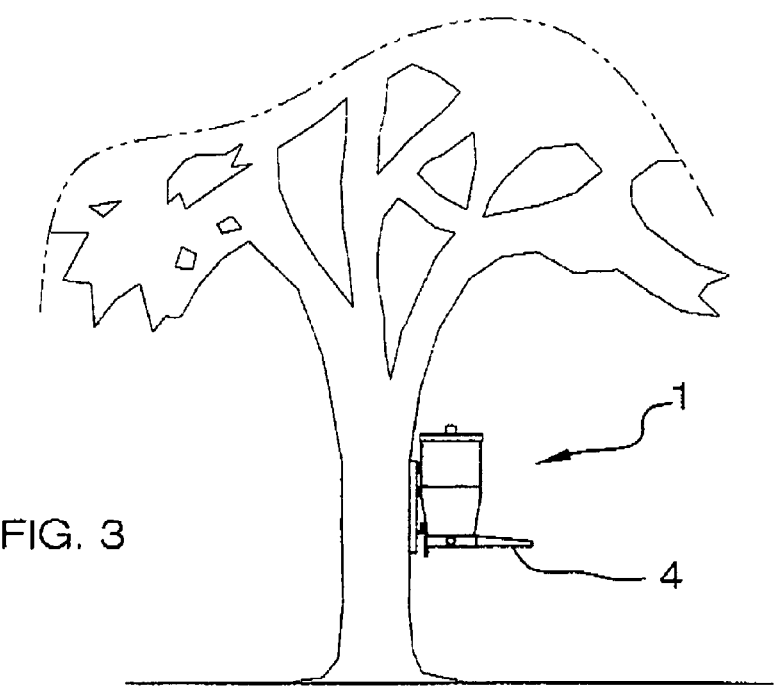
FIG. 3 is a side view of the food dispenser of FIG. 2, mounted on a tree.
Figure 6:
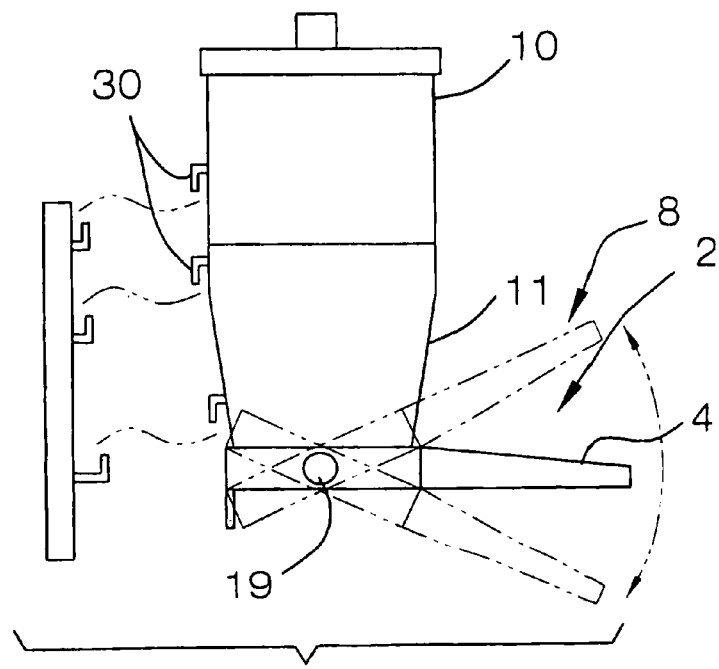
FIG. 6 is a side view of the food dispenser illustrating multiple food tray positions.

As shown in FIG. 2, a hopper bottom 14 is provided in the lower hopper portion 11 of the food hopper 10. A food adjustor 32 is provided in the food hopper 10. The food adjustor 32 may include the hopper bottom 14, the hopper opening 20 and the adjustment knob 19. A knob rod 18 engages and extends through openings (not labeled) in the wall of the lower hopper portion 11 and the base flanges 6, respectively, of the base 2. A knob 19 is provided on at least one, and typically both, ends of the knob rod 18. Accordingly, responsive to manipulation of the knob 19 on the knob rod 18, the food tray 4 can be pivoted to open or close the opening 20 as shown in FIG. 6, in which the food tray 4 is shown in three positions. As shown in FIG. 1, a removable lid 26, typically fitted with a handle 27, may be fitted on the upper hopper portion 12 to selectively close the hopper interior 13. At least one mount bracket 30 may be provided on the food hopper 10 to facilitate attachment of the food hopper 10 to a wall (not shown), for example.

In typical use of the animal food dispenser 1, the food tray 4 is adjusted to the closed position shown in FIG. 6 to block the hopper opening 20, typically by manipulation of the knob 19 attached to the knob rod 18. The lid 26 is removed from the food hopper 10, and a selected quantity of a particulate pet food (not shown) is placed in the hopper interior 13. The lid 26 is typically replaced on the food hopper 10. The pivot angle of the food tray 4 is adjusted from the closed position shown (FIG. 6) to the open position (also shown in FIG. 6) by manipulation of the knob 19, to establish communication between the hopper interior 13 and the hopper opening 20. Accordingly, the particulate pet food falls from the hopper interior 13 through the hopper opening 20 and into the base 2, respectively. The food tray 4 is returned to the closed position when the desired quantity of pet food has fallen into the base 2, thereby preventing further flow of pet food from the hopper interior 13 and into the base 2.

Figure 7:
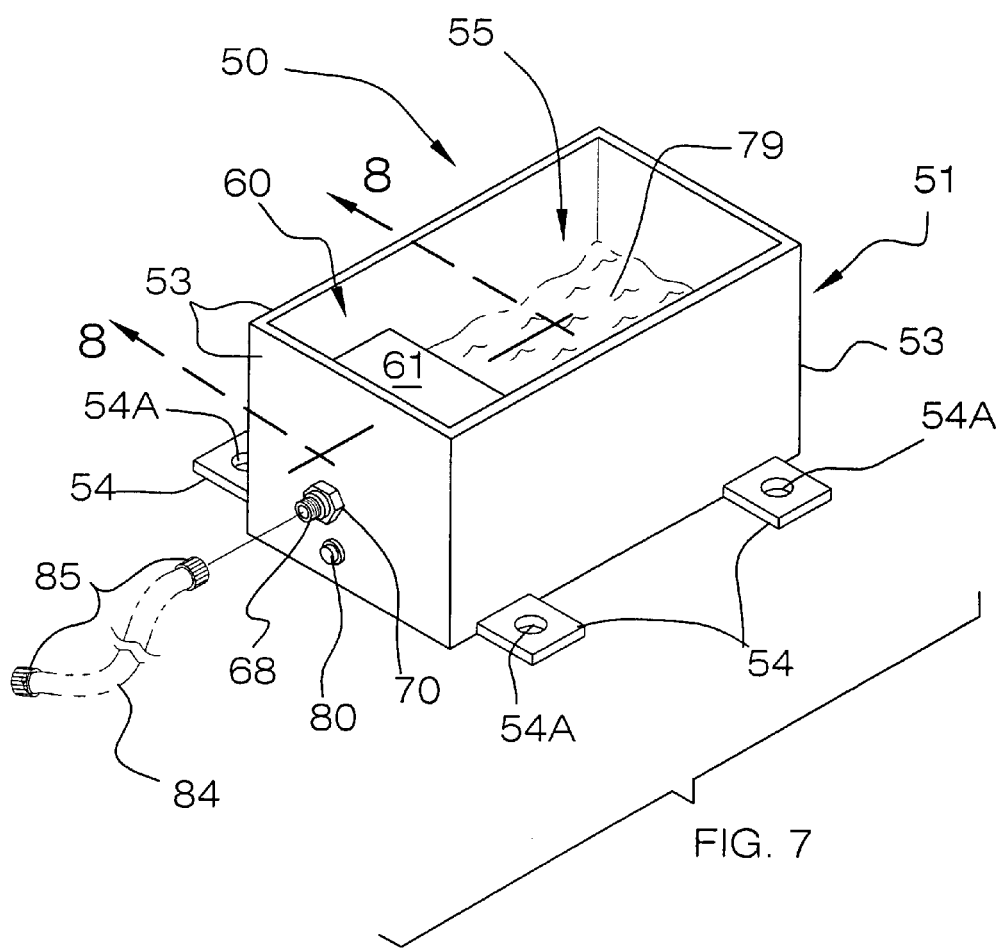
FIG. 7 is a perspective view of the present invention water dispenser.
Figure 8:
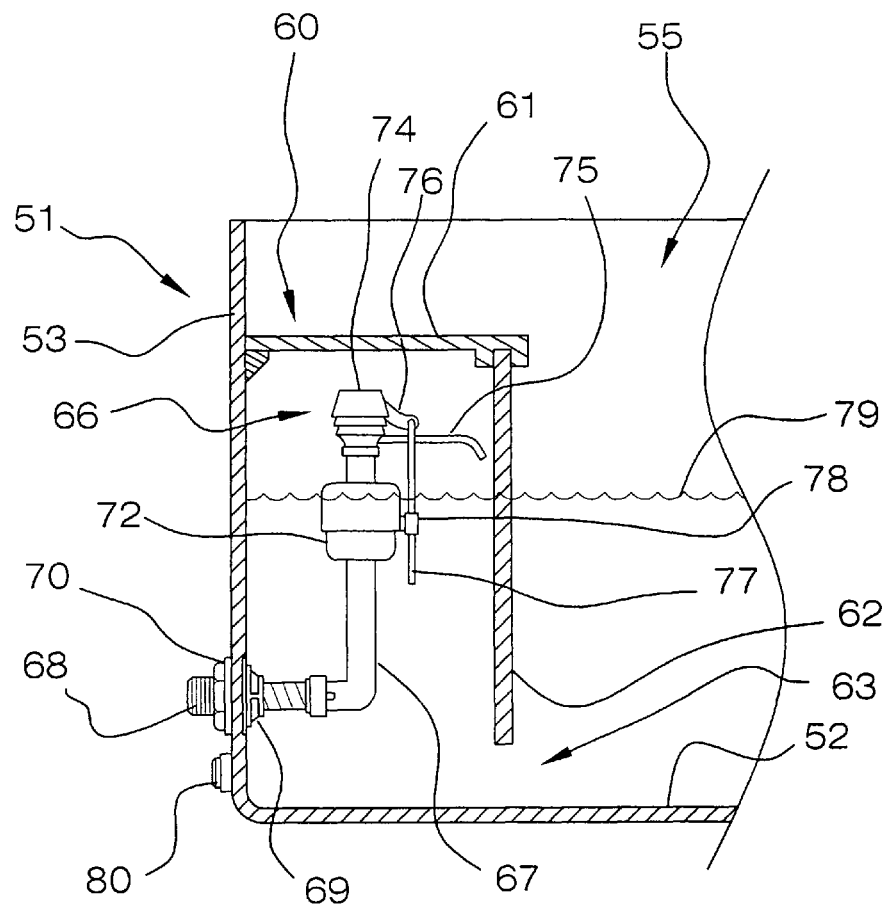
FIG. 8 is a cross-sectional view of the water dispenser.

Referring next to FIGS. 7 and 8, an illustrative embodiment of a water dispenser according to the present invention is generally indicated by reference numeral 50. The water dispenser 50 typically includes a base 51 having a base bottom 52 and upward-standing base walls 53 which define a base interior 55. Multiple base stabilizers 54, each typically provided with a fastener opening 54a, may be provided on the base bottom 52 to support the base 51 on a supporting surface (not shown). A base cover (not shown) may be removably fitted on the base 51 to selectively close the base interior 55.

A water valve cover 60 is provided in the base interior 55. The water valve cover 60 includes a cover top 61 which extends from the base wall 53, into the base interior 55, and a cover wall 62 which extends downwardly from the cover top 61. A bottom gap 63 is provided between the bottom edge of the cover wall 62 and the base bottom 52 to establish fluid communication between the interior of the water valve cover 60 and the base interior 55.

A fill valve 66 is provided in the water valve cover 60. The fill valve 66 includes a water conduit 67 which extends through the base wall 53 and is connected to a threaded inlet nipple 68 which is adapted to receive a threaded fitting 85 on a garden hose 84, for example, as shown in FIG. 7. A shank washer 69 and a lock nut 70 may be used to secure the water conduit 67 in the base wall 53, as shown in FIG. 8. A float 72 is slidably mounted for vertical displacement on the water conduit 67. A valve 74 is provided on the upper end of the water conduit 67, above the float 72. A dispensing spout 75 extends from the valve 74. A float rod 77 is attached to the float 72 through a water level adjustment clip 78, which adjustably engages the float rod 77. The upper end of the float rod 77 is further connected to the valve head 74 through a connecting arm 76. Therefore, water can normally be introduced into the base interior 55 by attaching a garden hose (not shown) to the inlet nipple 68 to facilitate the flow of water through the water conduit 67, valve 74 and dispensing spout 75, respectively, and into the base interior 55. Upon upward displacement of the float 72 on the water conduit 67, responsive to a rising water level 79 in the water valve cover 50, the float 72 pushes the float rod 77 and connecting arm 76 upwardly. The connecting arm 76, in turn, closes the valve 74 to prevent the further flow of water from the water conduit 67, through the dispensing spout 75 and into the base interior 55. The position of the float rod 77 with respect to the water level adjustment clip 78 can be selected to maintain a selected depth of the water level 79 in the base interior 55. A drain pipe 80 extends from the base interior 55, through the base wall 53, typically beneath the inlet nipple 68, for the discharge of water from the base interior 55. A valve (not shown) may be provided on the drain pipe 80 to facilitate the selective discharge of water from the base interior 55.

In typical use of the water dispenser 50, a water dish (not shown) is initially placed in front of the drain pipe 80. The base interior 55 is filled with water by connecting a hose (not shown) to the inlet nipple 68. The water is distributed from the hose, through the water conduit 67 and normally open valve 74, and is dispensed into the base interior 55 through the dispensing spout 75. As the water level 79 inside the water valve cover 60 gradually rises, the float 72 also rises on the water conduit 67. Eventually, the float rod 77, which rises with the float 72, causes the connecting arm 76 to close the valve 74. Consequently, water is incapable of continuing to flow from the water conduit 67, through the valve 74 and into the base interior 55.

Water is discharged from the base interior 55 and into the water dish (not shown) through the drain pipe 80. As the water level 79 in the water valve cover 60 gradually declines, the float 72 descends on the water conduit 72 and pulls the float rod 77 downwardly. Consequently, the connecting arm 76 again opens the valve 74, again allowing the flow of water from the water conduit 67, through the valve 74 and dispensing spout 75, and into the base interior 55, respectively. In the foregoing manner, the fill valve 66 maintains the desired water level 79 in the water valve cover 60 and base interior 55, which water level 79 is selected by the vertical position of the water level adjustment clip 78 on the float rod 77.

While the preferred embodiments of the invention have been described above, it will be recognized and understood that various modifications can be made in the invention and the appended claims are intended to cover all such modifications which may fall within the spirit and scope of the invention.

What is claimed is:

1. A device for dispensing dry particulate animal food without the use of a valve, the device comprising:
    a vertically positioned food hopper including an interior having an upper cylindrical portion and a lower frusto-conical portion, the hopper for retaining the dry particulate animal food, the dry particulate animal food dispensed into the hopper through the upper cylindrical portion, the lower frusto-conical portion including an aperture in a sidewall thereof;
    a base having opposing vertical walls, each wall pivotally attached by a rod to the lower frusto-conical portion so as to dispose the aperture between each wall;
    a food tray positionably carried by and extending from the base in cooperable relation to the aperture, the food tray wider than the base; and
    a knob connected to the rod of the wall of the base to pivotally manipulate the position of the food tray, the food tray positionable between a first position and a second position, wherein the first position permits the particulate animal food to dispense from the lower portion of the hopper through the aperture and onto the food tray, wherein in the second position the food tray prevents the particulate animal food to dispense from the lower portion of the hopper through the aperture and onto the food tray, wherein the particulate animal food is permitted to dispense from the lower portion of the hopper through the aperture and onto the food tray when the food tray is in a horizontal position, whereupon manipulating the knob the food tray is positionable to control the amount of the dry particulate animal food dispensed into the food tray from the hopper through the aperture without the use of a separate valve.

2. The device of claim 1 further comprising a bracket extending from the food hopper.

3. The device of claim 1 wherein the food tray engages the lower frusto-conical portion of the food tray.

4. A food dispensing apparatus for dispensing dry particulate animal food without the use of a separate valve, the apparatus comprising:
    a vertically positioned food hopper including an interior having an upper cylindrical portion and a lower frusto-conical portion, the hopper for retaining the dry particulate animal food, the dry particulate animal food dispensed into the hopper through the upper cylindrical portion, the lower frusto-conical portion closed at one end and including an aperture extending through a sidewall thereof;
    a base having opposing first and second vertical walls, the first vertical wall pivotally attached to the lower frusto-conical portion by a first bar, the opposing second vertical wall pivotally attached to the lower frusto-conical portion by a second bar, the aperture disposed between the first and second vertical walls;
    a food tray positionably carried by and extending from the base in cooperable relation to the aperture, the food tray being wider than the base; and
    a knob attached to the first rod and positioned on the first wall of the base to pivotally manipulate the position of the food tray, the food tray positionable between an open position and a closed position, wherein the first position permits the particulate animal food to dispense from the lower portion of the food hopper through the aperture and onto the food tray, wherein in the second position the food tray prevents the particulate animal food to dispense from the lower portion of the food hopper through the aperture and onto the food tray, whereupon manipulating the knob the food tray is positionable to control the amount of the dry particulate animal food dispensed into the food tray from the food hopper through the aperture without the use of a separate valve.

5. The apparatus of claim 4 further comprising a bracket extending from the food hopper for attaching the device to a stand-alone structure.

6. The apparatus of claim 4 wherein the particulate animal food is permitted to dispense from the lower portion of the hopper through the aperture and onto the food tray when the food tray is positioned perpendicular to the food hopper.

7. A device for dispensing dry particulate animal food, the device comprising:

a vertically positioned food hopper including an interior having an upper cylindrical portion and a lower frusto-conical portion, the food hopper for retaining the dry particulate animal food within the interior, the dry particulate animal food dispensed into the interior of the hopper through the upper cylindrical portion, the lower frusto-conical portion closed on a bottom end and including an aperture in a sidewall thereof;

a base having opposing vertical walls pivotally attached by a rod to outer surfaces of the lower frusto-conical portion orthogonal to the aperture;

a food tray positionably carried by and extending from the base in cooperable relation to the aperture, the food tray being wider than the base; and a knob attached to the rod and positioned on the wall of the base to pivotally manipulate the position of the food tray, the food tray positionable between an open position and a closed position, wherein the open position permits the particulate animal food to dispense from the lower portion of the food hopper through the aperture and onto the food tray, wherein in the closed position the food tray prevents the particulate animal food to dispense from the lower portion of the food hopper through the aperture and onto the food tray, whereupon manipulating the knob the food tray is positionable to control the amount of the dry particulate animal food dispensed onto the food tray from the hopper through the aperture without the use of a separate valve.

8. The device of claim 7 wherein the particulate animal food is permitted to dispense from the lower portion of the hopper through the aperture and onto the food tray when the food tray is positioned perpendicular to the food hopper.

9. The device of claim 8 and further comprising a bracket extending from the food hopper for attaching the device to a stand-alone structure.

\* \* \* \* \*